US011932005B2

(12) United States Patent
Kumai

(10) Patent No.: US 11,932,005 B2
(45) Date of Patent: Mar. 19, 2024

(54) TRANSPORTATION DEVICE AND RECORDING APPARATUS

(71) Applicant: SEIKO EPSON CORPORATION, Tokyo (JP)

(72) Inventor: Eiji Kumai, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 13 days.

(21) Appl. No.: 17/819,866

(22) Filed: Aug. 15, 2022

(65) Prior Publication Data

US 2022/0388316 A1 Dec. 8, 2022

Related U.S. Application Data

(63) Continuation of application No. 16/733,127, filed on Jan. 2, 2020, now Pat. No. 11,413,885, which is a continuation of application No. 15/293,038, filed on Oct. 13, 2016, now Pat. No. 10,543,702, which is a continuation of application No. 13/595,991, filed on Aug. 27, 2012, now abandoned.

(30) Foreign Application Priority Data

Aug. 30, 2011 (JP) ................................ 2011-187905

(51) Int. Cl.
*B41J 11/00* (2006.01)
*B41J 29/377* (2006.01)

(52) U.S. Cl.
CPC ...... *B41J 11/0022* (2021.01); *B41J 11/00214* (2021.01); *B41J 29/377* (2013.01)

(58) Field of Classification Search
CPC ......................................................... F24J 3/00
USPC ......................................................... 347/108
See application file for complete search history.

(56) References Cited

U.S. PATENT DOCUMENTS

| | | | | |
|---|---|---|---|---|
| 2,950,661 A | | 8/1960 | Limberger | |
| 4,598,990 A | * | 7/1986 | Kusumoto | G03G 15/2032 399/339 |
| 4,652,110 A | | 3/1987 | Sato et al. | |
| 5,045,887 A | * | 9/1991 | Nakamura | G03G 15/2035 399/122 |

(Continued)

FOREIGN PATENT DOCUMENTS

| | | |
|---|---|---|
| JP | H05-333614 | 12/1993 |
| JP | H10-193586 | 7/1998 |

(Continued)

*Primary Examiner* — Avinash A Savani
(74) *Attorney, Agent, or Firm* — WORKMAN NYDEGGER

(57) ABSTRACT

A transportation device includes a cover member that is displaceable between a closing position for closing an opening of a body case and an opening position for opening the opening, a processing unit that is arranged inside the body case, and performs a specified processing with respect to a medium transported to a working area communicating with the outside of the body case through the opening when the cover member is positioned at the opening position, and a transmitted unit that is positioned at a first position different from a position between the working area and the processing unit when the cover member is positioned at the closing position, and is positioned at a second position which is the position between the working area and the processing unit when the cover member is positioned at the opening position.

17 Claims, 8 Drawing Sheets

(56) References Cited

U.S. PATENT DOCUMENTS

| | | | |
|---|---|---|---|
| 5,291,256 | A | 3/1994 | Kitajima et al. |
| 6,584,299 | B2 * | 6/2003 | Nomura ............. G03G 15/6552 399/92 |
| 6,835,280 | B2 | 12/2004 | Lien et al. |
| 6,909,864 | B2 * | 6/2005 | Komatsubara ....... G03G 21/206 399/92 |
| 8,342,678 | B2 * | 1/2013 | Kawakami ............... B41M 5/52 347/100 |
| 9,434,850 | B2 | 9/2016 | Takeuchi et al. |
| 2002/0186986 | A1 * | 12/2002 | Makihira ........... G03G 15/2017 399/92 |
| 2003/0156177 | A1 * | 8/2003 | Nishikawa ........... B41J 11/0045 347/102 |
| 2003/0217815 | A1 | 11/2003 | Lein et al. |
| 2004/0003899 | A1 | 1/2004 | Lein et al. |
| 2006/0080052 | A1 | 4/2006 | Smith et al. |
| 2008/0038011 | A1 | 2/2008 | Nakajima et al. |
| 2008/0253797 | A1 | 10/2008 | Sakagami |
| 2009/0136253 | A1 | 5/2009 | Nakajima et al. |
| 2009/0256896 | A1 | 10/2009 | Scarlata |
| 2010/0207975 | A1 * | 8/2010 | Kawakami ............. B41J 29/393 347/19 |
| 2010/0245513 | A1 | 9/2010 | Ihara |
| 2010/0295905 | A1 | 11/2010 | Tamaki |
| 2011/0081176 | A1 | 4/2011 | Masuda |
| 2011/0142480 | A1 | 6/2011 | Miyata et al. |
| 2011/0227971 | A1 | 9/2011 | Hoshino |
| 2011/0229166 | A1 | 9/2011 | Mori et al. |
| 2013/0052601 | A1 | 2/2013 | Kumai |

FOREIGN PATENT DOCUMENTS

| | | |
|---|---|---|
| JP | H10-217443 | 8/1998 |
| JP | 2004-142313 | 5/2004 |

* cited by examiner

TRANSPORTATION DEVICE AND RECORDING APPARATUS

This application is a continuation application of U.S. patent application Ser. No. 16/733,127, filed Jan. 2, 2020, which is a continuation application of U.S. patent application Ser. No. 15/293,038, filed Oct. 13, 2016, which is a continuation application of U.S. patent application Ser. No. 13/595,991, filed Aug. 27, 2012, which claims the benefit of and priority to Japanese Patent Application No. 2011-187905 filed on Aug. 30, 2011. The entire disclosures of the above-mentioned applications are hereby incorporated herein by reference.

BACKGROUND

1. Technical Field

The present invention relates to a transportation device that transports a medium such as paper, or the like along a transportation direction, and a recording apparatus that includes a recording head for performing recording on the medium transported by the transportation device.

2. Related Art

In general, as a kind of recording apparatus, an ink jet printer that performs recording by ejecting ink (fluid) from the recording head to the medium such as paper, or the like has been known (see, JP-A-2004-142313). The ink jet printer described in JP-A-2004-142313 includes a substantially rectangular box-shaped body case, and the recording head is mounted inside the body case.

In an upper wall portion of the body case, an opening is provided for allowing the inside and outside of the body case to communicate with each other. In addition, the body case supports a cover member so as to be rotatable between a closing position capable of closing the opening and an opening position incapable of closing the opening. In addition, when problems such as paper jams and the like occur inside the body case, the cover member positioned at the closing position is rotated to the opening position, so that the inside of the body case communicates with the outside through the opening. Then, in order to eliminate the above problems, an operator performs a task in a state of entering their hands inside the body case through the opening.

However, in recent years, an ink jet printer with a mounted heater (a heating unit) for volatilizing solvent of ink adhered to a portion (hereinafter, referred to as "a recorded portion") of the medium for which recording is finished, and a processing unit for separating the recorded portion from the medium such as a cutter, or the like has been developed. The processing unit is a unit for performing a specified processing (heating processing, cutting processing, or the like) with respect to the medium, and thereby is arranged close to the transportation path of the medium inside the body case. Therefore, when a defect such as paper jam or the like occurs or maintenance is performed, an operator may perform a task in a state of entering their hands inside an area (hereinafter, referred to as "working area") near the arrangement position of the processing unit inside the body case through the opening.

However, when performing the task by entering their hands inside the working area of the body case, the operator performs the task while avoiding touch of the hands on the processing unit. In this case, the operator cannot concentrate on the task because of paying attention to the processing unit, and, as a result, more time than necessary is required for the task in the state of entering the hands inside the working area.

SUMMARY

An advantage of some aspects of the invention is to provide a transportation device and a recording apparatus, which may allow a task of an operator to be easily performed in a state in which the operator enters their hands inside a body case through an opening.

According to an aspect of the invention, there is provided a transportation device that transports a medium along a transportation direction inside a body case, and discharges the medium to the outside through a discharging port provided in the body case, including: a cover member that is supported by the body case in a displaceable state between a closing position capable of closing an opening formed on the body case and an opening position capable of opening the opening; a processing unit that is arranged inside the body case, and performs a specified processing with respect to the medium transported to a working area communicating with the outside of the body case through the opening when the cover member is positioned at the opening position; an interlocking mechanism that is driven in conjunction with displacement of the cover member; and a transmitted unit that moves when a driving force is transmitted from the interlocking mechanism, is positioned at a first position when the cover member is positioned at the closing position, and is positioned at a second position when the cover member is positioned at the opening position, wherein the first position is set as a position different from a position between the working area and the processing unit, and the second position is set as the position between the working area and the processing unit.

According to the above configuration, when the opening of the body case is closed by the cover member, the transmitted unit may be positioned at the first position and may not be positioned at the position between the working area and the processing unit so that the cover member is positioned at the closing position. Therefore, the specified processing may be performed with respect to the medium transported to the working area by the processing unit without interference by the transmitted unit. Meanwhile, when the cover member is displaced from the closing position to the opening position, the interlocking mechanism may be driven in conjunction with the displacement of the cover member. Then the transmitted unit positioned at the first position may be moved to the second position by the driving of the interlocking mechanism. As a result, the transmitted unit may be disposed between the working area and the processing unit. It becomes difficult for the hands of an operator, which enter inside the working area through the opening in this state, to contact the processing unit by an amount that the transmitted unit is positioned at the second position. Therefore, by an amount that contact between the processing unit and the hands is suppressed by the transmitted unit, it is possible for the operator to easily perform a task in a state of entering their hands inside the body case through the opening.

In the transportation device according to the aspect of invention, the processing unit may include a heating unit that heats the medium transported to the working area, the transmitted unit may include a shielding plate that shields heat from the heating unit to the working area when the shielding plate is positioned at the second position and has an opposite surface facing the medium transported along the transportation direction, the first position may be set as a position between the heating unit and the cover member positioned at the closing position, and the shielding plate may regulate outflow of gas inside the working area, which is heated by the heating unit, to the outside of the working area when the shielding plate is positioned at the first position.

According to the above configuration, when the shielding plate is moved to the second position, an installation area of the heating unit and the working area may be partitioned by the shielding plate. Therefore, when the shielding plate is positioned at the second position, the hands of the operator which enter inside the working area may be prevented from being heated by the heating unit. As a result, it is possible for the operator to easily perform a task in the state of entering their hands inside the working area. On the other hand, when the shielding plate is positioned at the first position, the shielding plate may act as a part of a side wall surrounding the working area. Therefore, it is possible to regulate outflow of gas inside the working area, which is heated by the heating unit, to the outside of the working area by the shielding plate positioned at the first position. Therefore, compared to when a member capable of regulating outflow of gas such as the shielding plate, or the like is not provided such as in the transmitted unit, it is possible to suppress an increase in power consumption in the heating unit when performing the specified processing (heating process) with respect to the medium.

The transportation device of the aspect of the invention may further include a blower that blows air toward the working area, wherein when the shielding plate is positioned at the first position, the shielding plate may act as a guide unit for guiding, to an exhaust port provided on a downstream side of the working area in the transportation direction, the air from the blower passed through the working area.

According to the above configuration, when the transmitted unit is positioned at the first position, the air generated in the blower may pass through the working area, and then may be discharged from the exhaust port provided on the downstream side in the transportation direction inside the body case to the outside of the body case. As a result, it is possible to reduce the probability of unnecessary convection occurring inside the body case after the air from the blower passes through the working area.

In the transportation device of the aspect of the invention, the second position may be set as a position between an invisible portion that is invisible from the outside through the opening in the processing unit and the working area.

Contact between a portion (hereinafter, referred to as "visible portion") that is visible from the outside through the opening in the processing unit and the hands of an operator which enter inside the working area may be more easily avoided by paying attention to the contact by the operator themselves compared to contact between the invisible portion and the hands. In other words, when the operator especially begins to concentrate on the task, the probability of the hands of the operator contacting the invisible portion of the processing unit may be increased. For this reason, in the aspect of the invention, the second position may be set as the position between the invisible portion of the processing unit and the working area. Therefore, the contact between the invisible portion of the processing unit and the hands of the operator which enter inside the working area may be suppressed by the transmitted unit arranged at the second position. Accordingly, it is possible for the operator to perform the task without paying attention to the contact between the invisible portion of the processing unit and their own hands. That is, it is possible to easily perform the task.

In the transportation device of the aspect of the invention, the processing unit may be supported so as to be displaceable with respect to the body case, the interlocking mechanism may include a first displacement mechanism unit that displaces the processing unit so that the working area is increased in conjunction with the displacement of the cover member when the cover member is displaced from the closing position to the opening position and a second displacement mechanism unit that moves the transmitted unit in conjunction with the displacement of the cover member, and the second position may be set as a position between the working area and an arrangement position of the processing unit when the cover member is positioned at the opening position.

According to the above configuration, the processing unit may be displaced in a direction in which the working area is increased, in conjunction with the displacement from the closing position of the cover member to the opening position. The transmitted unit may be arranged between the processing unit after the displacement and the working area. For this reason, compared to when the processing unit is not displaced accompanying the displacement of the cover member, it is possible to increase the working area. Accordingly, by an amount that the working area is increased, it is possible for the operator to easily perform a task in a state of entering their hands inside the working area.

According to another aspect of the invention, there is provided a recording apparatus, including the transportation device and a recording head that is arranged inside the body case, and performs recording with respect to a medium under transportation.

According to the above configuration, when the medium is transported to the working area set in the middle of the transportation path of the medium on which recording is performed by the recording head, the specified processing may be performed with respect to the medium by the processing unit. The contact between the processing unit and the hands of the operator which enter inside the working area may be suppressed by moving the transmitted unit to the second position. Therefore, when an operator performs a task by entering their hands inside the body case through the opening, the corresponding task may be easily performed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a recording apparatus according to an embodiment of the invention will be described with reference to FIGS. 1 to 8. In addition, in the following descriptions of the present specification, the direction perpendicular to a paper in FIG. 1 is referred to as a "first direction A", and the horizontal direction in FIG. 1 is referred to as a "second direction B".

Figure 1:
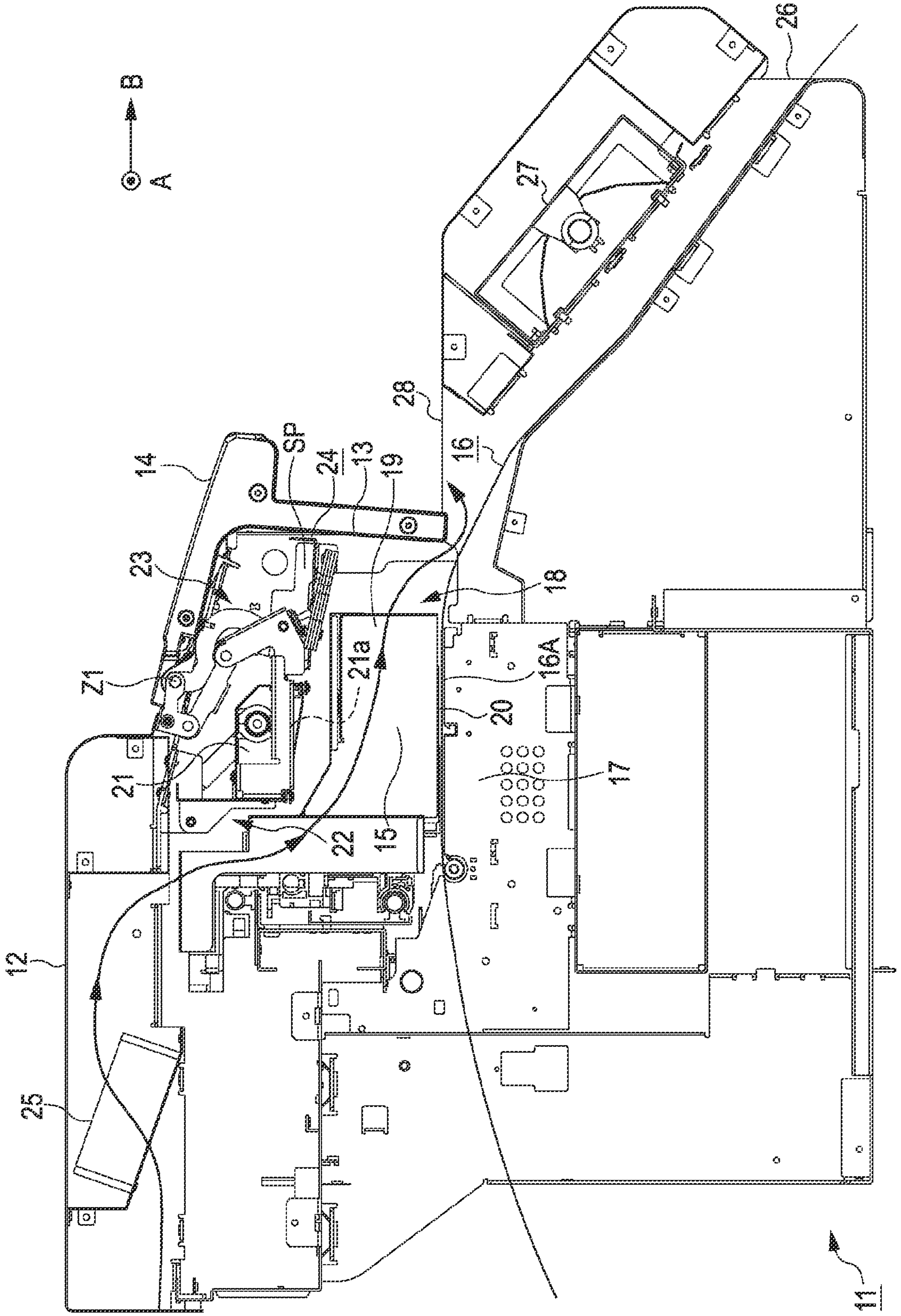
FIG. 1 is a side view showing a configuration inside a body case of an ink jet printer which is an embodiment of a recording apparatus according to the aspect of the invention.
Figure 2:
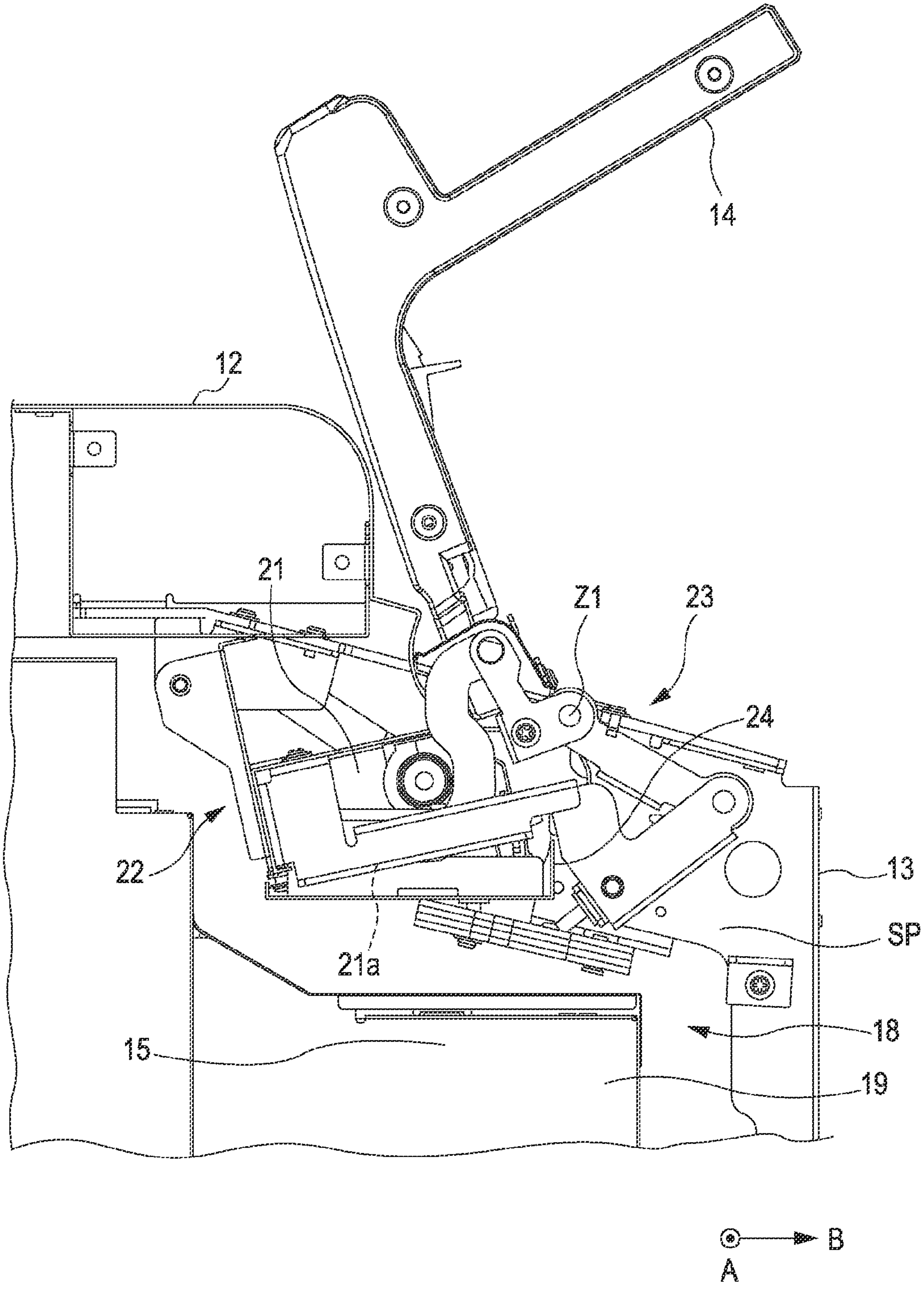
FIG. 2 is a main portion enlarged view showing a state in which a cover member is positioned in an opening position.

As shown in FIGS. 1 and 2, in the upper right in FIG. 1 in a body case 12 of an ink jet printer 11 which is an example of a recording apparatus, an opening 13 for communicating the inside and outside of the body case 12. The body case 12 supports a cover member 14 that closes and opens the opening 13, through a first rotation axis Z1 which extends in the first direction A. The cover member 14 is rotatable (displaceable) with respect to the body case 12 between a closing position (a position shown in FIG. 1) that closes the opening 13 and an opening position (a position shown in FIG. 2) that is set as a different position by a predetermined angle (for example, 125 degrees) set as at least 90 degrees from the closing position.

In addition, when the cover member 14 is positioned at the closing position, it is impossible to look inside the body case 12 from the outside through the opening 13. Meanwhile, when the cover member 14 is positioned at the opening position, the opening 13 is opened, and therefore it is possible to look inside the body case 12 from the outside through the opening 13.

In addition, on the lower side of a working area 15 in FIG. 1 communicating with the outside through the opening 13 inside the body case 12, a support base 17 that supports a film material 16 as an example of a medium transported to the working area 15 is provided. A top surface of the support base 17 is a support surface that supports the film material 16, and a recording mechanism 18 is provided at a position facing the support surface inside the working area 15. In addition, in the present embodiment, a transportation direction of the film material 16 inside the working area 15 coincides with the second direction B (horizontal direction).

The recording mechanism 18 includes a guide axis that extends in the first direction A (also referred to as "scanning direction") which is not shown, and a carriage 19 that is supported so as to be movable backward and forward in the first direction A with respect to the guide axis so as to be movable backward and forward in the optical axis direction. In a portion of the carriage 19 that faces the support surface, a recording head 20 that performs recording with respect to a recorded portion 16A of the film material 16 that is supported by the support base 17, by ejecting ink (fluid) as an example of a recording material.

In addition, on a region on an opposite side of the support base 17 interposing the working area 15 inside the body case 12, that is, on an upper side of the working area 15 in FIG. 1, a drying heater 21 (heating unit) as an example of the processing unit and a heater support mechanism 22 that constitutes an interlocking mechanism for supporting the drying heater 21 by the body case 12 so as to be rotatable are provided. The drying heater 21 includes a sheathed heater. When an operator looks inside the working area 15 from the opening 13, a portion of the drying heater 21 facing the working area 15 (a lower surface in FIG. 1) corresponds to an invisible portion 21*a* which cannot be viewed by the operator (or visual recognition is difficult). From the invisible portion 21*a*, heat energy is emitted downwardly in FIG. 1. As a result, a liquid component (that is, solvent) of ink adhered to the recorded portion 16A of the film material 16 is volatilized by the heat energy from the drying heater 21. That is, in the present embodiment, a heating processing (or referred to as a "dry processing") the ink from the film material that volatilizes the ink from the film material 16 corresponds to a specified processing.

In addition, on the upper side of the working area 15 in FIG. 1, a connection mechanism 23 that constitutes the interlocking mechanism which is driven in conjunction with rotation of the cover member 14 while supported by the cover member 14, and a shielding plate 24 as an example of the transmitted unit which is supported by the connection mechanism 23 are provided. When the cover member 14 is positioned at the closing position, the shielding plate 24 is arranged in a position closer to the opening 13 (the right side in FIG. 1) than the drying heater 21 in the second direction B. In this case, a gap SP formed between the drying heater 21 and the cover member 14 in the second direction B is nearly shielded by the shielding plate 24. Meanwhile, when the cover member 14 is moved from the closing position to the opening position, the shielding plate 24 is moved up to a position between the invisible portion 21*a* of the drying heater 21 and the working area 15. Due to this, heating of gas (air) inside the working area 15 and heating of the recorded portion 16A of the film material 16 by the drying heater 21 are suppressed. In the present embodiment, the arrangement position of the shielding plate 24 shown in FIG. 1 corresponds to a "first position" and the arrangement position of the shielding plate 24 shown in FIG. 2 corresponds to a "second position".

In addition, on a left obliquely upper side from the working area 15 in FIG. 1, a blower 25 (for example, a fan) for blowing air toward the working area 15 is provided. The blower 25 is arranged at a position separated from the opening 13 rather than the working area 15 in the second direction B. When the shielding plate 24 is positioned at the first position, the air which is sent toward the working area 15 by the blower 25 is guided to an exhaust port 28 that is positioned on the downstream side in the transportation direction in the body case 12 by the shielding plate 24. Most of the air guided to the downstream side in the transportation direction from the working area 15 is exhausted to the outside of the body case 12 through the exhaust port 28. Accordingly, in the present embodiment, when the shielding plate 24 is positioned at the first position, the shielding plate 24 acts as a guide unit for guiding the air from the blower 25 passing through the working area 15 to the downstream side from the working area 15 in the transportation direction.

In addition, a fixing heater 27 for fixing, to the film material 16, the ink adhered to the film material 16 transported to the downstream side from the working area 15 in the transportation direction is provided between the exhaust port 28 in the transportation direction and a discharging port 26 for discharging the film material 16 to the outside of the body case 12. The fixing heater 27 is positioned on an upper side of a transportation path of the film material 16. The film material 16 heated by the fixing heater 27 is discharged to the outside through the discharging port 26.

Next, the heater support mechanism 22 will be described with reference to FIG. 3.

Figure 3:
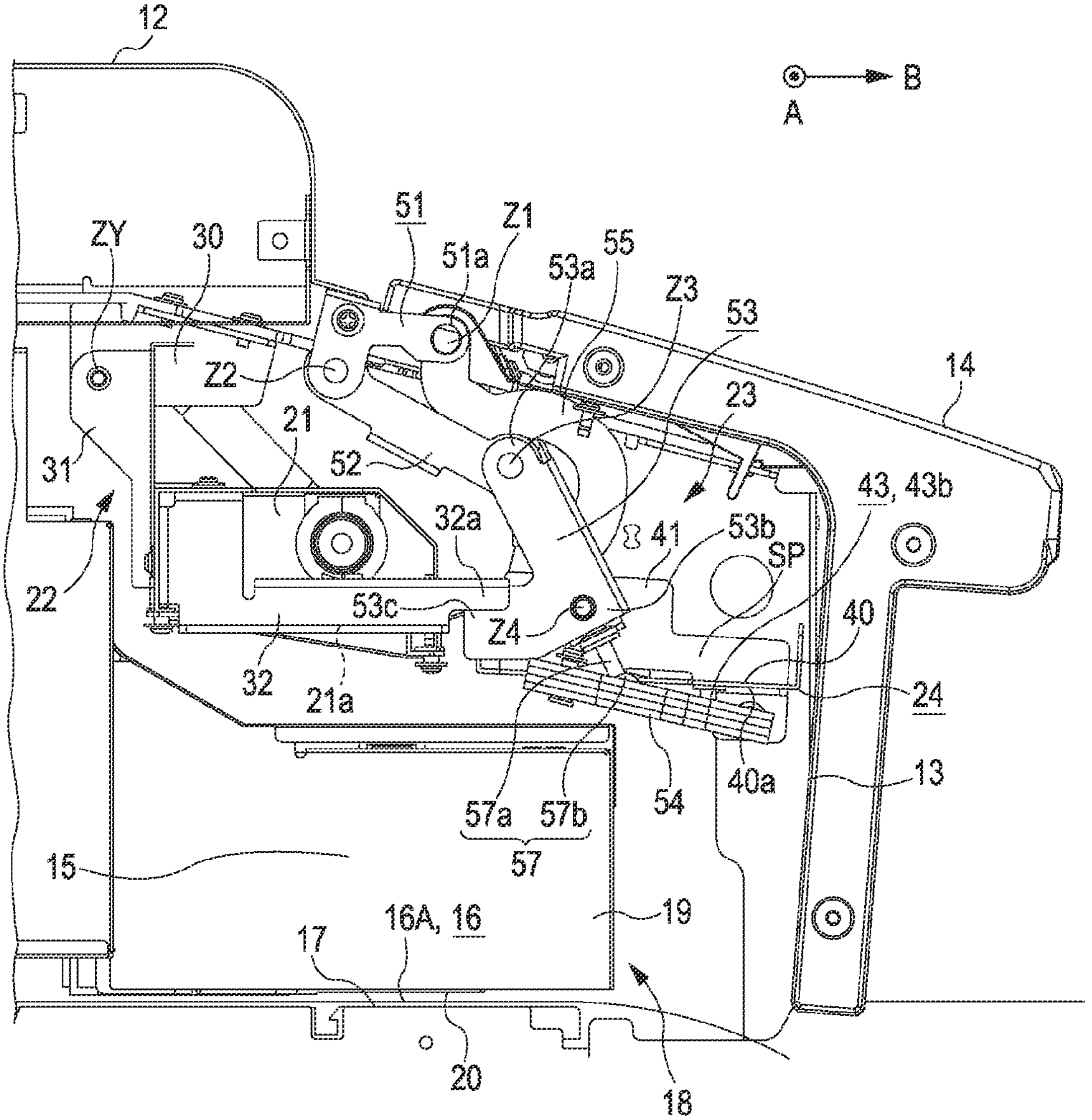
FIG. 3 is an enlarged view obtained by enlarging a main portion in FIG. 1.

As shown in FIG. 3, on both ends in the first direction A in the upper side of the drying heater 21 of the body case 12, a heater support portion 30 for supporting the heater support mechanism 22 is respectively provided. The heater support mechanism 22 includes a pair of support shafts ZY which are supported by the heater support portion 30 in a freely rotatable state, and each of the support shafts ZY extends along the first direction A. In addition, the support shafts ZY are supported by the heater support portion 30 at a position to be the side (that is, the left side in FIG. 3) far from the opening 13 rather than the drying heater 21 in the second direction B.

Each of the support shafts ZY supports an end (an upper end in FIG. 1) of connection members 31 which extend in one direction (downward in FIG. 3). When the support shaft ZY is rotated, each of the connection members 31 is rotated around the support shaft ZY. In addition, the other end (a lower end portion in FIG. 1) of each of the connection members 31 is positioned at a position (the left side in FIG. 1) far from the opening 13 rather than the drying heater 21 in the second direction B. Heater support members 32 which support the drying heater 21 on both sides in the first direction A are respectively attached to the other end of each of the connection members 31. Each of the heater support members 32 is configured so as to extend in one direction (a horizontal direction in FIG. 3). An engaged portion 32*a* (a right end in FIG. 3) that is a tip of the heater support member 32 is positioned on a side (a right side in FIG. 3) closer to the opening 13 than the drying heater 21 in the second direction B.

Next, the shielding plate 24 and the connection mechanism 23 will be described with reference to FIGS. 3 to 6.

Figure 4:
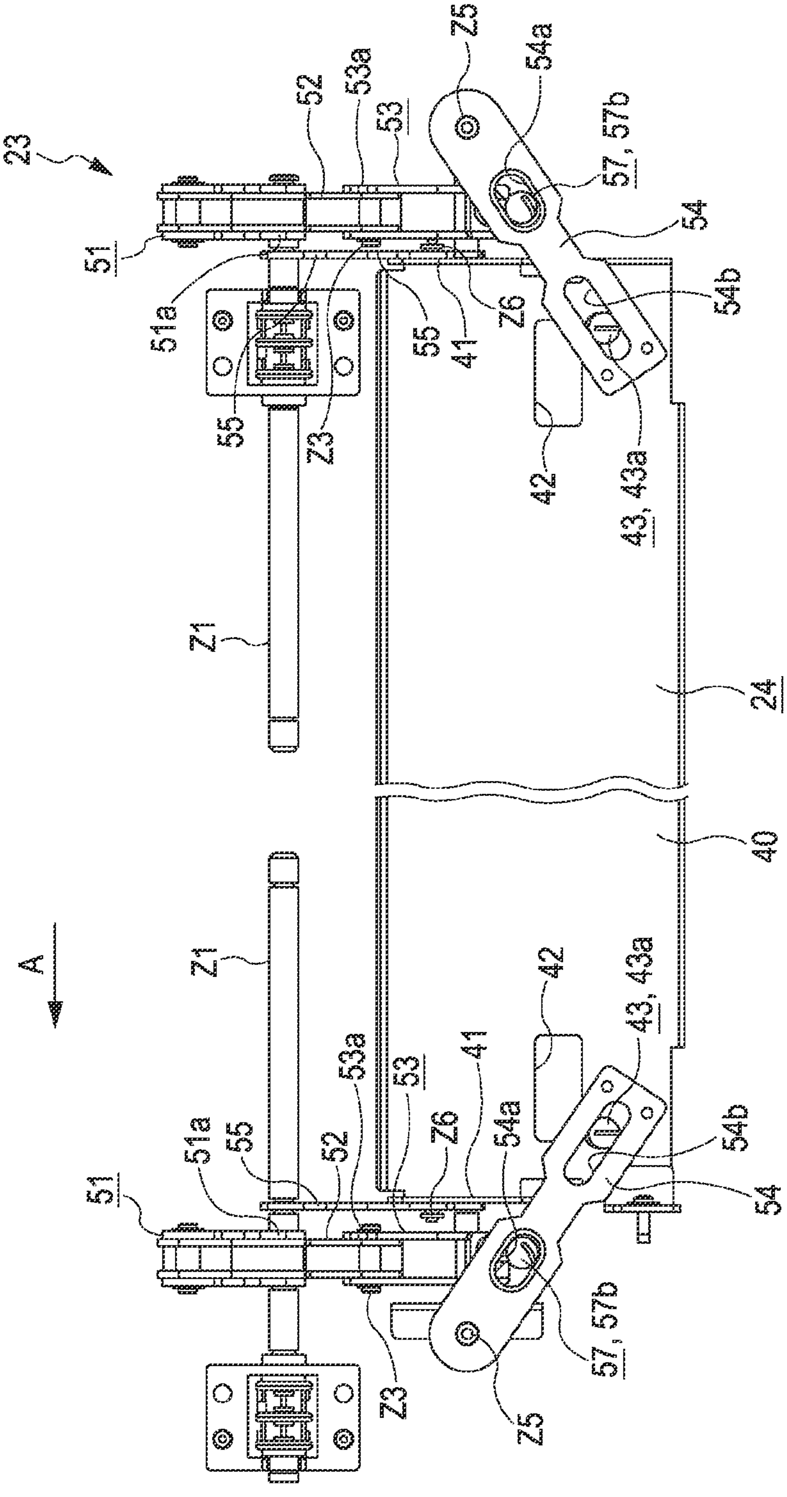
FIG. 4 is a plan view showing an interlocking mechanism.

As shown in FIGS. 3 and 4, the shielding plate 24 is made of a substantially rectangular plate material (for example, a metal plate or a synthetic resin plate material) whose longitudinal direction coincides with the first direction A. The shielding plate 24 includes an opposing portion 40 whose lower surface acts as an opposing surface 40*a* capable of facing the film material 16 which is transported along the transportation direction. A supported portion 41 which is formed by folding both end portions of the shielding plate 24 in the longitudinal direction at nearly a right angle is respectively provided on both sides of the opposing portion 40 in the first direction A.

In addition, on both sides of the opposing portion 40 of the shielding plate 24 in the longitudinal direction, an escape hole 42 is respectively formed further toward the lower side (that is, a side closer to the opening 13) than the center in the vertical direction in FIG. 4. A connection bolt 43 is respectively fixed to each position further toward the lower side than the escape hole 42 in FIG. 4. Each of the connection bolts 43 includes a head portion 43*a* and a shaft portion 43*b* projected from the head portion 43*a*. A tip of the shaft portion 43*b* is fixed to the shielding plate 24, and at the same time, the head portion 43*a* is supported by the shielding plate 24 so as to be positioned on a side (a front side when viewed on a paper in FIG. 4) closer to the transportation path of the film material 16 than the opposing surface 40*a*. That is, a certain interval is interposed between the head portion 43*a* and the opposing surface 40*a*.

The connection mechanism 23 according to the present embodiment includes a pair of mechanisms which are arranged on both sides of the shielding plate 24 in the first direction A, and both the mechanisms have the same configuration. Therefore, hereinafter, a description will be given centering on one mechanism, and descriptions of the other mechanism will be omitted.

Figure 5:
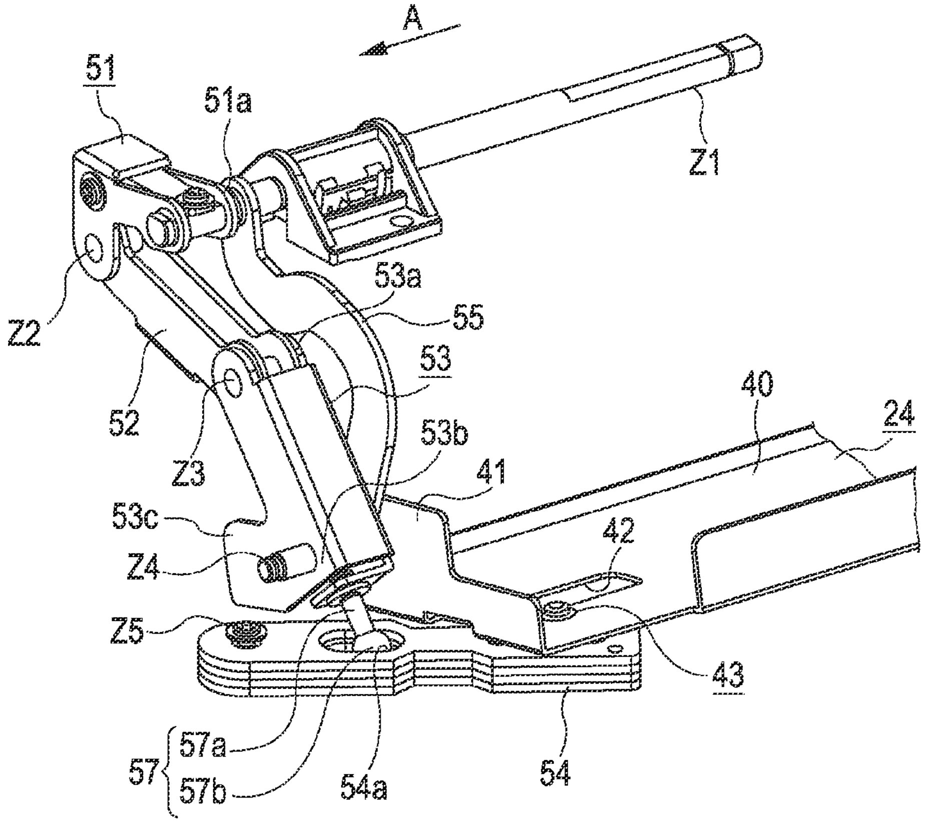
FIG. 5 is a perspective view showing an interlocking mechanism.

As shown in FIGS. 3 and 5, the connection mechanism 23 includes a first arm 51 that has a substantially "L" shape in a plan view, and supported by a first rotating shaft Z1. The first arm 51 includes a first portion that extends in one direction and a second portion that extends in a direction perpendicular to the one direction from a base end of the first position, and a tip of the first portion becomes a support portion 51*a* which is supported by the first rotating shaft Z1. In addition, a second rotating shaft Z2 that extends in the first direction A is provided on a tip of the second portion, and supports an end of a second arm 52 that extends in one direction so as to be freely rotatable.

A third rotating shaft Z3 that extends in the first direction A is provided on the other end of the second arm 52, and supports a third arm 53 that has a substantially "L" shape in a plan view so as to be freely rotatable. The third arm 53 includes a first portion that extends in one direction and a second portion that extends in a direction perpendicular to the one direction from a base end of the first portion. A tip of the first portion of the third arm 53 is a support portion 53*a* that is supported by the third rotating shaft Z3. In addition, a fourth rotating shaft Z4 that is projected outwardly in the first direction A is provided in a connection portion 53*b* of each of the first and second portions in the third arm 53. A tip of the fourth rotating shaft Z4 is supported by the body case 12 in a freely rotatable state. That is, the third arm 53 is rotatable around the fourth rotating shaft z4.

In addition, a tip of the second portion of the third arm 53 is an engaging portion 53*c* that is engaged with the engaged portion 32*a* of the heater support member 32 from its lower side (that is, the working area 15 side). When the third arm 53 is rotated so that the engaging portion 53*c* is displaced upward, the heater support mechanism 22 including the heater support member 32 is rotated around the support shaft ZY. As a result, the drying heater 21 supported by the heater support mechanism 22 is rotated (displaced) around the support shaft ZY so that the working area 15 is increased. Specifically, the drying heater 21 is rotated so that the amount of displacement of a portion of the drying heater 21 closer to the opening 13 is larger than the amount of displacement of a portion of the drying heater 21 far from the opening 13. Accordingly, in the present embodiment, a first displacement mechanism unit includes the heater support mechanism 22 and the first to third arms 51 to 53 of the connection mechanism 23.

In addition, a connection member 57 that is projected to an opposite side of the first portion of the third arm 53 is provided in the connection member 53*b* of the third arm 53. The connection member 57 includes a rod portion 57*a* that extends in one direction and a spherical portion 57*b* that is provided on a tip of the rod portion 57*a*. The fourth arm 54 that extends in one direction is connected to the third arm 53 through the connection member 57.

As shown in FIGS. 4 and 5, the fourth arm 54 is arranged on a lower side of the shielding plate 24. An end portion of the fourth arm 54 in the longitudinal direction is arranged outwardly from the shielding plate 24 in the first direction A. In this manner, the end portion of the fourth arm 54 is supported by the body case 12 so as to be rotatable around a fifth rotating shaft Z5 that extends in a vertical direction (a direction perpendicular to a paper in FIG. 4). In addition, on a side of the fourth arm 54 slightly closer to an end portion of the fourth arm 54 in the longitudinal direction than a center thereof, a first long hole 54*a* whose longitudinal direction coincides with the longitudinal direction of the fourth arm 54 is formed. The spherical portion 57*b* of the connection member 57 is engaged inside the first long hole 54*a*. In addition, a second long hole 54*b* whose longitudinal direction coincides with the longitudinal direction of the fourth arm 54 is formed on the other end portion of the fourth arm 54 in the longitudinal direction. The head portion 43*a* of the connection bolt 43 supported by the shielding plate 24 is engaged inside the second long hole 54*b*.

When the third arm 53 is rotated around the fourth rotating shaft Z4, the spherical portion 57*b* of the connection member 57 which is supported by the third arm 53 is moved in the first long hole 54*a*. In this instance, a force for rotating the fourth arm 54 is transmitted from the third arm 53 to the fourth arm 54, and the fourth arm 54 is rotated around the fifth rotating shaft Z5. Then, the force from the third arm 53 is transmitted to the shielding plate 24 in a state of being amplified by the fourth arm 54, and the shielding plate 24 is moved toward the second position from the first position (or toward the first position from the second position).

Figure 6:
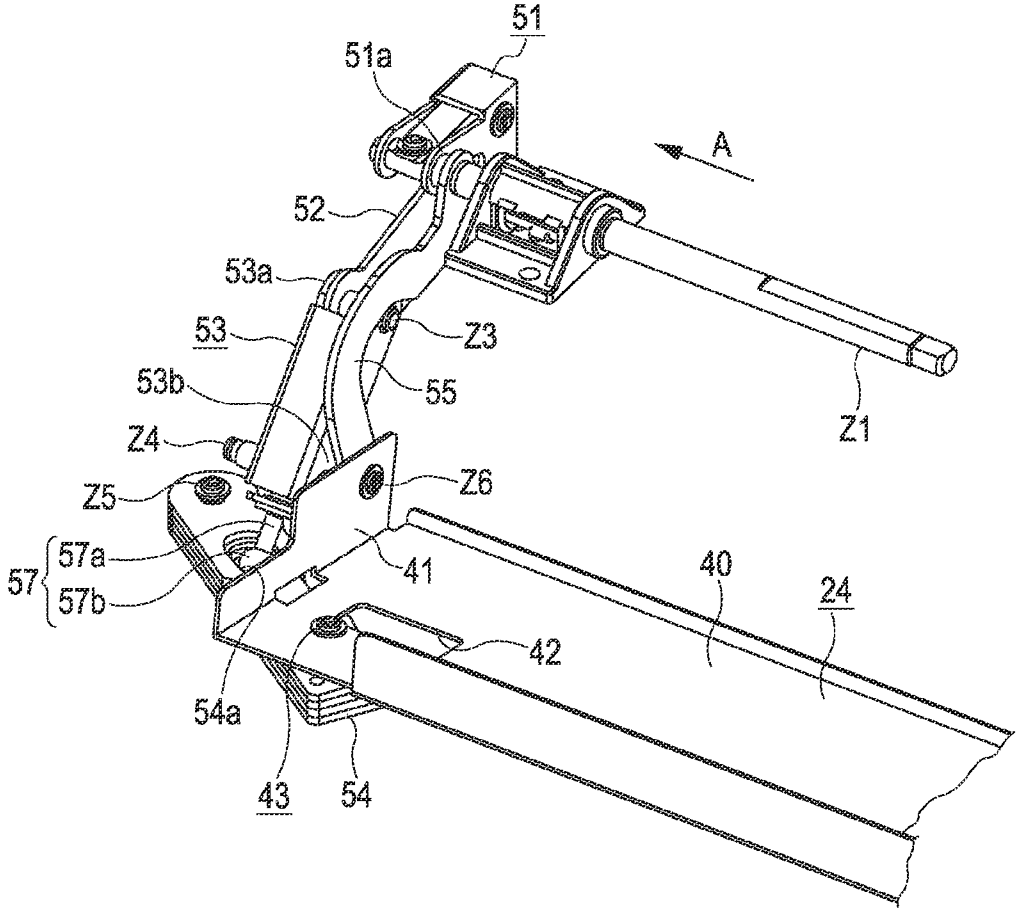
FIG. 6 is a perspective view showing an interlocking mechanism.

Meanwhile, as shown in FIGS. 5 and 6, the first rotating shaft Z1 supports, inwardly from the first arm 51, an end of the fifth arm 55 that has a substantially "S" shape in a plan view so as to be freely rotatable. The other end of the fifth arm 55 supports the supported portion 41 of the shielding plate 24 so as to be rotatable around a sixth rotating shaft Z6 that extends in the first direction A. Specifically, the fifth arm 55 is connected to an end portion of the supported portion 41 of the shielding plate 24 far from the opening 13.

When the first rotating shaft Z1 is rotated, the fifth arm 55 is relatively rotated with respect to the first rotating shaft Z1. That is, when the shielding plate 24 to which power from the fourth arm 54 is transmitted is moved, the fifth arm 55 is rotated in the opposite direction to a rotation direction of the first rotating shaft Z1. Next, the fifth arm 55 guides the shielding plate 24 positioned at the first position (or the second position) to the second position (or the first position). Accordingly, in the present embodiment, the connection mechanism 23 acts as a second displacement mechanism unit.

Next, the action of the ink jet printer 11 according to the present embodiment will be described.

First, effects at the time of a recording processing with respect to the film material 16 will be described.

At the time of recording on the recorded portion 16A of the film material 16, the drying heater 21 emits heat energy toward the recorded portion 16A. Then, the temperature of gas inside the working area 15 is elevated by the drying heater 21. For this reason, the recorded portion 16A is heated, and a liquid component (solvent) of ink adhered to the recorded portion 16A is volatilized.

In this instance, the shielding plate 24 is arranged (see, FIG. 3) at a first position closer to the opening 13 than the drying heater 21 in the second direction B so that the opposing surface 40*a* faces the film material 16. That is, when the cover member 14 is positioned at the closing position, the working area 15 is surrounded by the shielding plate 24 and the cover member 14. For this reason, upward outflow of the gas, whose temperature is elevated inside the working area 15, through the gap SP between the drying heater 21 and the cover member 14 is suppressed by the shielding plate 24 positioned at the first position. Accordingly, compared to when outflow of the gas, whose temperature is elevated inside the working area 15, to the outside of the working area 15 cannot be suppressed by the shielding plate 24, it is possible to dry the recorded portion 16A of the film material 16 in a state in which an amount of power consumption in the drying heater 21 is reduced.

In addition, a blower 25 for blowing air toward the working area 15 is provided in the ink jet printer 11 according to the present embodiment. Solvent volatilized from the recorded portion 16A of the film material 16 is guided to the outside of the working area 15 by the air sent from the blower 25. In this instance, when the shielding plate 24 is not positioned at the first position, a part of the air including the volatilized solvent tries to move upward through the gap SP from the working area 15. However, on an upper side of the working area 15, an exhaust portion for discharging air to the outside of the body case 12 is not provided. For this reason, a problem arises that unnecessary convection occurs on the upper side of the working area 15. A problem arises that, when the convection occurs, the solvent included in the air is adhered to various components, and the like which are positioned on inner walls of the body case 12 and the upper side of the working area 15 inside the body case 12. In this case, the inside of the body case 12 and the various components are liable to be contaminated, and therefore there may be a need for raising execution frequency of maintenance including wiping.

Here, at the time of recording according to the present embodiment, the shielding plate 24 is positioned at the first position. For this reason, the solvent volatilized from the film material 16 is guided to the downstream side in the transportation direction from the working area 15 by the shielding plate 24. That is, movement of the air including the volatilized solvent to an upper area of the working area 15 through the gap SP is suppressed by the shielding plate 24. Thereafter, most of the volatilized solvent is exhausted to the outside of the body case 12 through the exhaust portion 28 which is provided between the drying heater 21 and the fixing heater 27 in the transportation direction.

Figure 7:
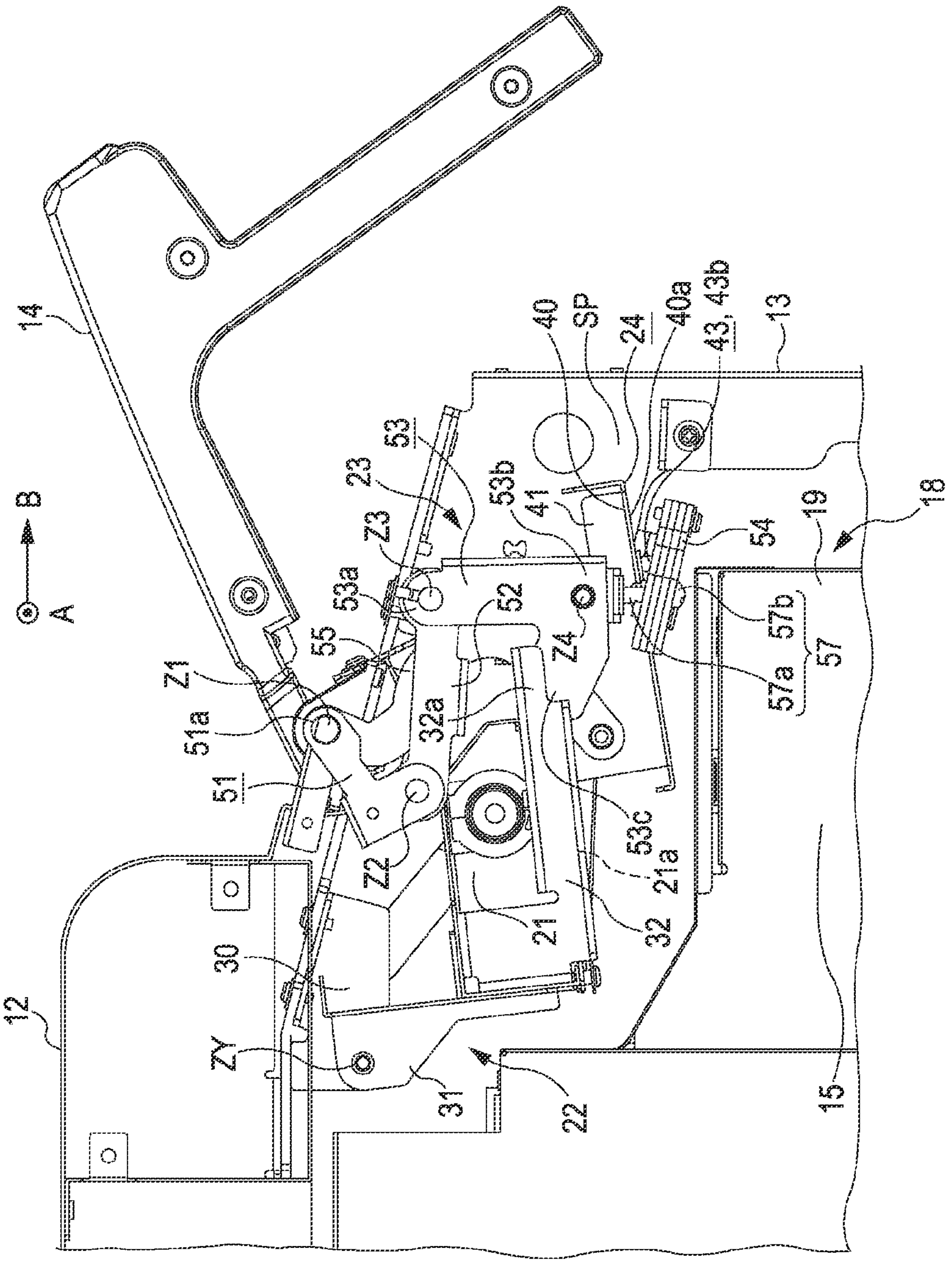
FIG. 7 is an action view showing a state in which a cover member is rotated toward an opening position from a closing position.
Figure 8:
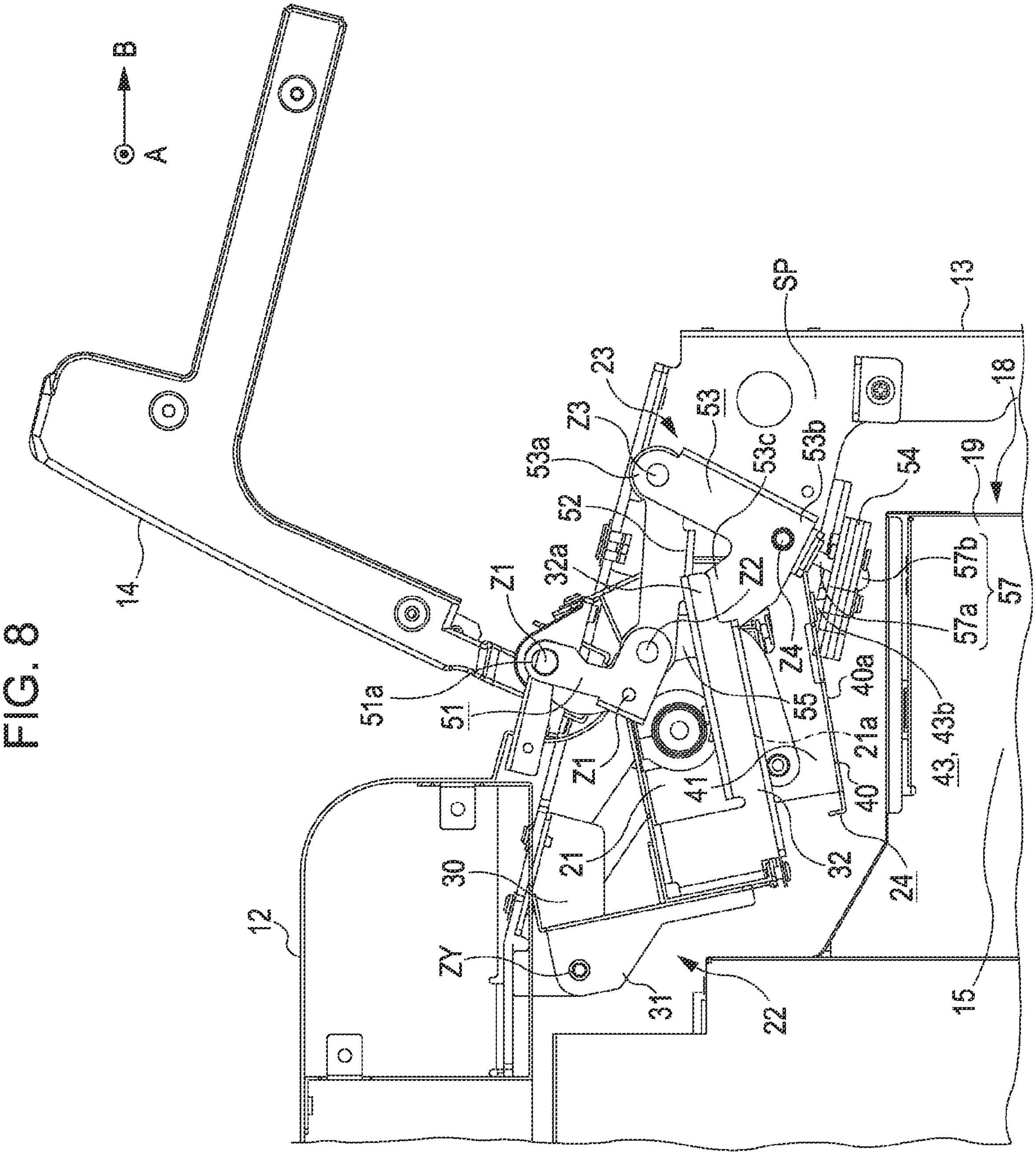
FIG. 8 is an action view showing a state in which a cover member is rotated toward an opening position from a closing position.

Next, effects when a transportation of the film material 16 failure occurs inside the working area 15 will be described with reference to FIGS. 7 and 8.

However, when problems occur inside the working area 15, the cover member 14 is rotated from the closing position to the opening position by an operator. In this instance, as shown in FIGS. 7 and 8, the connection mechanism 23 is driven in conjunction with rotation from the closing position of the cove member 14 to the opening position thereof. Specifically, accompanying the rotation of the cover member 14, the first rotating shaft Z1 supporting the cover member 14 is rotated in the counterclockwise direction in FIG. 7. Then, the first arm 51 supported by the first rotating shaft Z1 is rotated around the first rotating shaft Z1 is rotated in the counterclockwise direction in FIG. 7.

Next a force generated by the rotation of the first arm 51 is transmitted to the second arm 52 which is supported through the second rotating shaft Z2 to the first arm 51. Then, the second arm 52 is displaced by being pushed out to the right side in FIG. 7 by the force based on the rotation of the first arm 51. Next, the force transmitted to the second arm 52 from the first arm 51 is transmitted to the third arm 53 which is supported through the third rotating shaft Z3 to the second arm 52. Then, the third arm 53 is rotated around the fourth rotating shaft Z4 in a clockwise direction in FIG. 7. In this instance, the engaging portion 53*c* pushes, upwardly in FIG. 7, the engaged portion 32*a* of the heater support member 32 that supports the drying heater 21. Then, the heater support mechanism 22 including the heater support member 32 is rotated around the support shaft ZY in the counterclockwise direction in FIG. 7. As a result, the drying heater 21 is rotated so that an end portion (the right end portion in FIGS. 7 and 8) closer to the opening 13 in the second direction B is displaced in a direction (upward in FIGS. 7 and 8) separated from the working area 15. By the rotation of the drying heater 21, the working area 15 is increased compared to before the start of the rotation of the drying heater 21. In particular, a region closer to the opening 13 that is an entrance hole for the hands of the operator in the working area 15 is increased by the rotation of the drying heater 21.

In addition, when the third arm 53 is rotated around the fourth rotating shaft Z4, the fourth arm 54 connected to the third arm 53 through the connection member 57 is rotated around the fifth rotating shaft Z5. As a result, a force (that is, a force for moving the shielding plate 24 from the first position to the second position) generated by the rotation of the fourth arm 54 is transmitted to the shielding plate 24 which is connected to the fourth arm 54 through the connection bolt 43. Then, by the transmitted force, the shielding plate 24 begins to move from the first position to the second position.

In addition, the first rotating shaft Z1 also supports the fifth arm 55. When the shielding plate 24 is moved from the first position to the second position, the fifth arm 55 is moved in the clockwise direction in FIG. 7. By the rotation of the fifth arm 55, the shielding plate 24 is guided from the first position to the second position.

Next, when the cover member 14 is arranged at the closing position, the shielding plate 24 is arranged at the second position between the working area 15 and the invisible portion 21*a* of the drying heater 21 after the rotation is completed. In a state in which the opening 13 is opened, an installation area of the drying heater 21 is partitioned from the working area 15 by the shielding plate 24. For this reason, when performing a task by entering their hands inside the working area 15 through the opening 13, it is possible for an operator to perform the corresponding task without paying attention to contact between the drying heater 21 and their own hands. In addition, as described above, the region closer to the opening 13 that is the entrance hole of operator's hands in the working area 15 is increased by a displacement of the drying heater 21 accompanying the rotation of the cover member 14 to the closing position. For this reason, the operator easily enters their own hands inside the working area 15 through the opening 13.

Next, after termination of the task, the cover member 14 is rotated from the opening position to the closing position so as to close the opening 13. Then, the connection mechanism 23 is driven in conjunction with the rotation of the cover member 14 in the closing position. In other words, the shielding plate 24 is moved toward the first position from the second position. At the same time, the drying heater 21 is rotated so that an end portion (the right end portion in FIGS. 7 and 8) closer to the opening 13 in the second direction B is displaced in a direction (downward in FIGS. 7 and 8) approaching the working area 15. In addition, in this instance, a drive form of the connection mechanism 23 is opposite to a drive form of the connection mechanism 23 when the cover member 14 is moved from the closing position to the opening position, and therefore the detailed descriptions thereof will be omitted.

According to the above-described embodiments, it is possible to obtain the following effects.

(1) When the opening 13 of the body case 12 is closed by the cover member 14, the shielding plate 24 is positioned at the first position. For this reason, the drying heater 21 may perform a heating process with respect to the film material 16 which is transported to the working area 15 without interference by the shielding plate 24. Meanwhile, when the cover member 14 is rotated from the closing position to the opening position, the connection mechanism 23 is driven in conjunction with the rotation of the cover member 14. Then, the shielding plate 24 which is positioned at the first position is moved to the second position between the working area 15 and the installation area of the drying heater 21, by the driving of the connection mechanism 23. As a result, when the cover member 14 is positioned at the opening position, the shielding plate 24 is arranged between the working area 15 and the drying heater 21. Even though the hands of the operator enter inside the working area 15 through the opening 13 in this state, contact between the hands and the drying heater 21 is suppressed by the shielding plate 24. For this reason, by an amount that the contact between the drying heater 21 and the hands is suppressed by the shielding plate 24, it is possible for the operator to easily perform a corresponding task in a state in which the hands of the operator enter inside the body case 12 through the opening 13.

(2) When the shielding plate 24 is moved to the second position, the installation area of the drying heater 21 and the working area 15 are partitioned by the shielding plate 24. For this reason, the shielding plate 24 is positioned at the second position, and therefore hands of the operator which enter inside the working area 15 are suppressed from being heated by the drying heater 21. As a result, by an amount that the operator does not have to pay attention to heat energy from the drying heater 21, it is possible to easily perform a task in a state in which hands of the operator enter inside the working area 15.

(3) On the other hand, when the shielding plate 24 is positioned at the first position, the shielding plate 24 acts as a part of a side wall surrounding the working area 15. For this reason, outflow of gas inside the working area 15, whose temperature is elevated by the drying heater 21, to the upper side of the working area 15 is suppressed by the shielding plate 24 which is positioned at the first position. Therefore, compared to when a member capable of regulating outflow of gas such as the shielding plate 24, or the like is not provided by the transmitted unit, it is possible to suppress an increase in power consumption in the drying heater 21 when performing the heating process with respect to the film material 16.

(4) In addition, when the shielding plate 24 is positioned at the first position, air generated in the blower 25 is guided to the exhaust port 28 side by the shielding plate 24 after passing through the working area 15, and, as a result, exhausted to the outside of the body case 12 from the exhaust port 28. That is, the shielding plate 24 is provided in the first position, and therefore the air passing through the working area 15 may be suppressed from being guided to an upper area from the working area 15 inside the body case 12, and occurrence of unnecessary convection inside the body case 12 may be suppressed. In addition, the volatilized solvent which is generated by the heating processing with respect to the film material 16 performed by the drying heater 21 may be discharged to the outside of the body case 12 from the exhaust port 28.

(5) Contact between a portion (hereinafter, referred to as a "visible portion") of the drying heater 21 which can be viewed by an operator from the outside through the opening 13 and hands of the operator which enter inside the working area 15 is more easily avoided by paying attention to the contact by the operator themselves compared to contact between the invisible portion 21*a* of the drying heater 21 and the hands. In other words, when, in particular, the operator begins to concentrate on the task, the hands of the operator are liable to contact the invisible portion 21*a*. For this reason, in the invention, the second position may be set as the position between the invisible portion 21*a* and the working area 15. Here, in the present embodiment, the second position is set as between the invisible portion 21*a* and the working area 15. For this reason, the contact between the invisible portion 21*a* and the hands of the operator which enter inside the working area 15 may be suppressed by the shielding plate 24 positioned at the second position. Accordingly, the operator may perform a task without paying attention to the contact between their own hands and the invisible portion 21*a*. That is, it is possible to easily perform a corresponding task.

(6) In the present embodiment, when the cover member 14 is rotated from the closing position to the opening position, the drying heater 21 is rotated so that the working area 15 is increased. Next, the shielding plate 24 is arranged in a position between the working area 15 and the drying heater 21 after the rotation is terminated. For this reason, compared to when the drying heater 21 is not rotated accompanying the rotation of the cover member 14, it is possible to increase the working area 15. Accordingly, by an amount that the working area 15 is increased, it is possible for an operator to easily perform a corresponding task in a state in which the hands of the operator enter inside the working area 15.

(7) In addition, the engaging portion 53*c* for rotating the drying heater 21 is provided in the third arm 53 of the connection mechanism 23 of the present embodiment. That is, compared to when a mechanism for rotating the shielding plate 24 and a mechanism for rotating the drying heater 21 are separately provided, a configuration of the interlocking mechanism including the connection mechanism 23 may be simplified.

In addition, the above embodiment may be modified as follows.

In the embodiment, even though force from the third arm 53 of the connection mechanism 23 is not granted to the heater support mechanism 22, when the cover member 14 is moved from the closing position to the opening position, the heater support mechanism 22 may have a configuration capable of rotating the drying heater 21 so that the working area 15 is increased. For example, the support shaft ZY may be rotated corresponding to the rotation (displacement) of the cover member 14, and at the same time, the heater support mechanism 22 may be rotated integrally with the support shaft ZY. When configured in this manner, the support shaft ZY is rotated by the rotation of the cover member 14, the heater support mechanism 22 is rotated, and, as a result, the drying heater 21 which is supported by the heater support mechanism 22 is rotated.

In the embodiment, when the cover member 14 is rotated from the closing position to the opening position, the heater support mechanism 22 may move the drying heater 21 in a direction far from the opening 13 in the second direction B.

In the embodiment, the heater support mechanism 22 may support the drying heater 21 so that the drying heater 21 is not displaced. In this case, the engaging portion 53*c* may not be provided in the third arm 53.

In the embodiment, the exhaust port 28 may not be provided. In this case, the air passing through the working area 15 is exhausted to the outside of the body case 12 through the exhaust port 26. That is, the discharging port 26 may act as the exhaust port.

In the embodiment, the blower 25 may not be provided.

In the embodiment, the connection mechanism 23 may have an arbitrary configuration other than the above-described configurations as long as the connection mechanism 23 can move the shielding plate 24 between the first position and the second position in accordance with the rotation of the cover member 14.

In the embodiment, the transmitted unit may have an arbitrary shape other than a plate (the shielding plate 24) as long as the contact between the drying heater 21 and operators' hands which enter inside the working area 15 when the transmitted unit is positioned at the second position can be suppressed. For example, the transmitted unit may have a net-like member, and have a configuration in which a plurality of rods extend in the first direction A are arranged along the second direction B.

In the embodiment, the recording mechanism 18 may be arranged in the upstream side from the working area 15 in the transportation direction.

In this case, the processing unit which is arranged on an upper portion of the working area 15 may have a cutting member (for example, a cutter) for cutting the film material 16. In this case, a cutting processing on the film material 16 performed by the cutting member corresponds to the specified processing.

In addition, when the ink adhered to the film material 16 in the recording mechanism 18 is UV-curable ink, the processing unit may be a lighting device capable of irradiating ultraviolet light to the film material 16. In this case, an irradiation processing by the lighting device corresponds to the specified processing.

In addition, when the recording mechanism 18 is arranged on the upstream side from the working area 15 in the transportation direction, the recording mechanism may be a so-called lateral scan type in which a scanning direction of the carriage 19 coincides with the transportation direction. In addition, the recording mechanism may not move the recording head 20 that is supported by the carriage 19 at the time of recording.

In the embodiment, the recording mechanism may be a recording mechanism including a wire-impact recording head, a thermal transfer recording head, or an electrophotographic recording head.

In the embodiment, if the heating processing with respect to the film material 16 performed by the drying heater 21 is not interfered by the shielding plate 24 positioned at the second position, the second position may be set as an arbitrary position (for example, the left side in FIG. 1 from the first position) inside the body case 12.

In the embodiment, if the cover member 14 can be displaced between the closing position and the opening position, the cover member 14 may be provided in the body case 12, for example, so as to be slidably moved.

In the embodiment, as the medium, media other than the film material 16 (for example, a cutform paper, a roll paper, and cloth) may be used.

The transportation device of the aspect of the invention may be provided in a liquid ejection device that ejects or discharges another fluid other than ink, or provided in a variety of liquid ejection devices which include a liquid ejection head and the like for discharging a small amount of liquid droplets. In addition, the liquid droplets refer to a state of the liquid discharged from the liquid ejection device, and include granular droplets, tear-shaped liquid droplets, and droplets having a thread like tail. Here, a material of the liquid that can be ejected by the liquid ejection device may be possible. For example, as the material of the liquid, a material whose substance is in a state of liquid phase may be used, and the material of the liquid may include a liquid body having a higher or lower viscosity, a fluid such as sol, gel water, other inorganic solvent, organic solvent, solution, a liquid resin, and a liquid metal (a metal melt), a material obtained in such a manner as that particles of functional materials including a solid material such as pigments and metal particles as well as a liquid as an example of the substance are dissolved, dispersed, or mixed in solvent, or the like. In addition, as a representative example of the liquid, ink described in the above embodiment, a liquid crystal, or the like may be given. Here, as the ink, aqueous ink, oily ink, a variety of liquid compositions such as gel ink, hot melt ink, and the like may be generally used. As specific examples of the liquid ejection device, a liquid ejection device for ejecting a liquid containing a material such as an electrode material used in manufacturing liquid crystal displays, EL (electroluminescence) displays, surface-emitting displays, and color filters, a coloring material, or the like which is dispersed or dissolved, a liquid ejection device for ejecting a living organic matter used in manufacturing bio-chips, a liquid ejection device for ejecting a liquid to be a sample used as a precision pipette, a printing device, a micro-dispenser, or the like may be given. In addition, a liquid ejection device for ejecting lubricant to a precision machine such as watches, cameras, or the like using a pinpoint, a liquid ejection device for ejecting transparent resin solution such as an ultraviolet-curable resin on a substrate in order to form a micro hemispherical lens (optical lenses) or the like used in an optical communication element or the like, a liquid ejection device for ejecting etching solution such as acid, alkali, or the like in order to etch a substrate or the like may be used. In addition, the fluid may be a powder such as toner or the like. In addition, the fluid used throughout in the specification does not include fluid containing only gas.

What is claimed is:

1. A processing apparatus for processing with respect to a medium, the processing apparatus comprising:

a body case forming a working area;

a processor that is positioned in an upper portion of the working area, and is configured to process the medium;

a first supporter configured to support the medium, the first supporter having a portion that is positioned in a lower portion of the working area; and a blower disposed above the processor, the blower configured to blow air between the processor and the first supporter within the working area and toward at least the portion of the first supporter positioned below the processor.

2. The processing apparatus according to claim 1, further comprising:

a cover member that is supported by the body case in a displaceable state between a closing position configured to close an opening formed on the body case and an opening position configured to open the opening.

3. The processing apparatus according to claim 2, wherein the processor processes the medium transported to a working area communicating with the outside of the body case through the opening when the cover member is positioned at the opening position.

4. The processing apparatus according to claim 2, further comprising:

a second supporter configured to support the medium, the second supporter being disposed downstream of the first supporter in a transportation direction of the medium; wherein in a state in which the cover member is positioned at the closing position, a gap through which the medium is configured to pass, is provided between an end portion of the cover and the second supporter, and the blown air toward at least the portion of the first supporter opposite the processor, is exhausted through the gap.

5. The processing apparatus according to claim 4, wherein the first supporter includes a first support surface that is configured to support the medium, the second supporter includes a second support surface that is configured to support the medium, and the second support surface is formed so as to face obliquely downward with respect to the first support surface.

6. The processing apparatus according to claim 4, further comprising:

a guide unit disposed in the body case configured to guide the air from the blower from above the processor toward at least the portion of the first supporter opposite the processor, wherein the guide unit guides the blown air so that the blown air is exhausted through the gap.

7. The processing apparatus according to claim 2, wherein the body case includes a rotation axis that supports the cover member, the cover member is configured to be displaced between the closing position and the opening position by being rotated about the rotation axis, and the processor is disposed below the rotation axis.

8. The processing apparatus according to claim 5, wherein the processor is configured to be displaced with respect to the first supporter by moving in a region where the air from the blower is blown.

9. The processing apparatus according to claim 1, further comprising:

a guide unit disposed in the body case configured to guide the air from the blower from above the processor toward at least the portion of the first supporter opposite the processor.

10. The processing apparatus according to claim 9, wherein the processor is disposed downstream of the guide unit in a transportation direction of the medium.

11. The processing apparatus according to claim 7, further comprising:

a guide unit disposed in the body case configured to guide the air from the blower from above the processor toward at least the portion of the first supporter opposite the processor wherein the guide unit is disposed below the rotating axis.

12. The processing apparatus according to claim 7, wherein the processor is disposed on a side opposite to the blower with respect to the guide unit in the transport direction of the medium.

13. The processing apparatus according to claim 6, wherein the guide portion is disposed above the first supporter with an interval therebetween.

14. The processing apparatus according to claim 1, wherein the blower is disposed in a top portion of the body case.

15. The processing apparatus according to claim 1, further comprising:

a heating unit disposed in the body case configured to heat the medium.

16. The processing apparatus according to claim 1, wherein the blown air is exhausted to the outside of the body through an exhaust port disposed in the body case.

17. The processing apparatus according to claim 1, wherein most of the blown air is guided to the downstream in a transportation direction of the medium.

* * * * *